(12) United States Patent
Meuter

(10) Patent No.: US 9,062,686 B2
(45) Date of Patent: Jun. 23, 2015

(54) SEALING ARRANGEMENT FOR A ROTATING SHAFT

(71) Applicant: Sulzer Pumpen AG, Winterthur (CH)

(72) Inventor: Paul Meuter, Seuzach (CH)

(73) Assignee: Sulzer Pumpen AG, Winterthur (CH)

( * ) Notice: Subject to any disclaimer, the term of this patent is extended or adjusted under 35 U.S.C. 154(b) by 0 days.

(21) Appl. No.: 13/907,153

(22) Filed: May 31, 2013

(65) Prior Publication Data

US 2013/0322794 A1   Dec. 5, 2013

(30) Foreign Application Priority Data

May 31, 2012 (EP) ..................................... 12170163

(51) Int. Cl.
*F16C 33/74* (2006.01)
*F04D 29/12* (2006.01)
*F16J 15/00* (2006.01)
*F16J 15/34* (2006.01)
*F16J 15/40* (2006.01)

(52) U.S. Cl.
CPC ................ *F04D 29/12* (2013.01); *F16C 33/74* (2013.01); *F16J 15/004* (2013.01); *F16J 15/3484* (2013.01); *F16J 15/406* (2013.01)

(58) Field of Classification Search
CPC ....... F16J 15/002; F16J 15/406; F16J 15/348; F16J 15/32524; F04D 29/12; F16C 33/74
USPC .................. 384/99, 129, 130, 132, 311, 134; 277/345, 350, 353, 364–366, 367, 387; 415/113, 230
See application file for complete search history.

(56) References Cited

U.S. PATENT DOCUMENTS

| | | | | | |
|---|---|---|---|---|---|
| 3,051,858 | A | * | 8/1962 | McCown et al. | 310/104 |
| 3,472,522 | A | * | 10/1969 | Winfrey | 277/352 |
| 3,511,513 | A | * | 5/1970 | Dahlheimer | 277/353 |
| 3,591,188 | A | * | 7/1971 | Eisner | 277/366 |
| 5,058,905 | A | * | 10/1991 | Nosowicz et al. | 277/365 |
| 5,336,047 | A | * | 8/1994 | Kolhouse | 415/168.2 |
| 5,738,356 | A | * | 4/1998 | Marshall | 384/99 |
| 6,325,175 | B1 | * | 12/2001 | Dittrich et al. | 184/6.16 |

(Continued)

FOREIGN PATENT DOCUMENTS

DE         4219289 A1 * 12/1993 ............ F16J 15/34
DE   202004007560 U1   8/2004

(Continued)

OTHER PUBLICATIONS

European Search Report mailed Oct. 30, 2012 in European Application No. 12170163.5, 6 pages.

*Primary Examiner* — Marcus Charles
(74) *Attorney, Agent, or Firm* — Kilpatrick Townsend & Stockton LLP

(57) ABSTRACT

A sealing arrangement for a rotating shaft, which is in particular designed as a drive shaft of a pump, has a stationary seal holder in which a first and a second slide ring seal are supported. The slide ring seals each have a co-rotating rotary seal part and a stationary seal part. A sealing space is formed between the slide ring seals and the seal holder to which sealing fluid can be supplied via a feed line. In order to enable good rotor dynamics of the shaft with the seal arrangement, a bearing is arranged between the first and the second slide ring seals by means of which the shaft can be supported with respect to the seal holder.

11 Claims, 2 Drawing Sheets

(56) References Cited

U.S. PATENT DOCUMENTS

Figure 1:
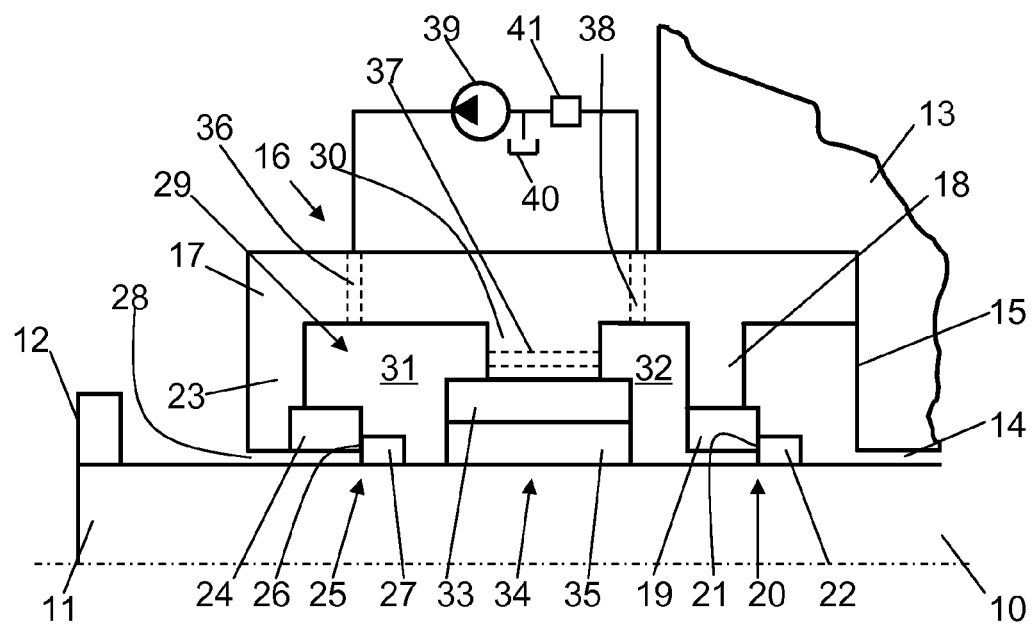

| | | | |
|---|---|---|---|
| 6,976,679 B2 * | 12/2005 | Goss et al. | 415/113 |
| 7,775,527 B2 * | 8/2010 | Meuter | 277/303 |
| 2009/0096175 A1 * | 4/2009 | Schwerdtfeger | 277/549 |
| 2011/0248449 A1 * | 10/2011 | Li et al. | 277/302 |
| 2012/0027564 A1 * | 2/2012 | Felix | 415/1 |

FOREIGN PATENT DOCUMENTS

| | | | | |
|---|---|---|---|---|
| DE | 102008057950 A1 * | 5/2010 | | F16J 15/34 |
| DE | 102009015863 A1 | 10/2010 | | |
| DE | 102009020483 A1 * | 12/2013 | | F16J 15/34 |
| EP | 1205696 A2 | 5/2002 | | |
| JP | 49-49355 U | 4/1974 | | |

* cited by examiner

SEALING ARRANGEMENT FOR A ROTATING SHAFT

CROSS REFERENCE TO RELATED APPLICATIONS

This application claims priority to European Application No. 12170163.5 filed on May 31, 2012, the disclosure of which is incorporated by reference herein.

The invention relates to a sealing arrangement for a rotating shaft.

DE 199 28 141 A1 describes a sealing arrangement for a rotating shaft. The sealing arrangement can in particular be used for a drive shaft of a pump, wherein the sealing arrangement is in this case fixedly connected to a housing of the pump and the drive shaft projects out of the housing. The sealing arrangement has a stationary seal holder which has a cut-out through which the shaft can project. A first and a second slide ring seal are supported in the seal holder, with the slide ring seals each having a co-rotating rotary sealing part and a stationary sealing part. A sealing space is formed between the slide ring seals and the seal holder and sealing fluid can be supplied to said sealing space via a supply line. The slide ring seals are arranged so that the shaft can project through both slide ring seals and through the cut-out of the seal holder. Such slide ring seal combinations are usually marketed as ready-to-fit units which can be checked for leak-tightness before installation and which prevent assembly errors.

Such seal arrangements are usually used with rotating shafts which project out of a housing, for example out of a pump housing. The sealing arrangement serves to seal the housing in the region in which the shaft projects through the housing. Depending on the conditions of use, it is in this respect mainly a question of preventing an entry of fluid or particles from the environment into the housing or an exit of the fluid contained in the housing.

Rotating shafts, however, not only have to be sealed, but also supported. Solutions are known in which the support is arranged within the housing. This has the result that a part of the shaft, the so-called overhang, projecting out of the housing is comparatively long. This can result in unfavorable rotor dynamics, that is in vibration problems at the shaft. Solutions are moreover known in which the support of the shaft is arranged behind the seal arrangement viewed from the housing. This makes a separate support housing necessary to receive and seal the bearing. Since the bearings used usually also have to be lubricated, a separate lubricant supply of the bearing is also necessary in this case. On the arrangement of the bearing within a pump housing, the lubrication can also take place by the fluid to be conveyed. This can, however, also result in problems if the fluid to be conveyed contains particles which can damage the bearing, that is the fluid to be conveyed has abrasive properties.

In view of this, it is the object of the invention to propose a sealing arrangement for a rotating shaft which enables good rotor dynamics of the shaft with a simple design of the seal arrangement. The object is satisfied by a sealing arrangement such as the exemplary sealing arrangement described herein.

In accordance with the invention, a bearing is arranged between the first slide ring seal and the second slide ring seal by means of which the shaft can be supported with respect to the seal holder. The overhang of the rotating shaft is thus comparatively short, which allows good rotor dynamics of the shaft. At the same time, the bearing is arranged in the sealing space bounded and shielded by the seal holder and by the slide ring seals so that no separate housing for the bearing is necessary.

In an embodiment of the invention, a co-rotating rotary sealing part and a stationary seal part of the slide ring seals are arranged next to the bearing. The slide ring seals are thus arranged in a so-called tandem arrangement. The sealing fluid which is supplied to the sealing space is in this case called a so-called "quench fluid" or "quench medium". The pressure of the sealing fluid is in this case equal to or smaller than the pressure to be blocked in the housing. If a leak occurs at the slide ring seal arranged closer to the pressure to be blocked, the exiting fluid is taken up by the sealing fluid and can neutralized. In addition, the leak can be recognized by analysis or monitoring of the sealing fluid. A secure operation of the sealing arrangement is thus made possible.

In an embodiment of the invention, both co-rotating rotary sealing parts of the slide ring seals are arranged next to the bearing. The slide ring seals are thus arranged in a so-called "back-to-back" arrangement. The sealing fluid which is supplied to the sealing space is in this case called a so-called "barrier fluid". The pressure of the sealing fluid is in this case larger than the pressure to be blocked in the housing. If a leak occurs at the slide ring seal arranged closer to the pressure to be blocked, the sealing fluid flows into the housing due to the higher pressure in the sealing space and it is in every case prevented that fluid can exit the housing. A leak at one of the two slide ring seals can be recognized by monitoring the pressure of the sealing fluid. An indication for this is a pressure drop of the sealing fluid. A particularly secure operation of the sealing arrangement is thus made possible.

In an embodiment of the invention, the bearing is designed as a slide bearing. The bearing can, for example, be manufactured from a bronze alloy, from an aluminum alloy or from a steel composite material. The running surfaces can additionally be coated, with a white metal layer being possible, for example. It is also possible that the sliding bearing can be made up of two parts, namely the stationary part and the rotating part, with both parts each being composed of a plurality of layers which are connected, for example, soldered, to one another. The two inner layers form the respective slide layers which slide on one another on rotation of the shaft. The use of slide bearings allows a simple and inexpensive design of the sealing arrangement. Slide bearings additionally require less construction space and are low-maintenance.

In an embodiment of the invention, the sealing fluid is used for lubricating the bearing. The bearing is therefore arranged within the sealing space such that it comes into contact with the sealing fluid and in particular the sealing fluid can arrive at the points of the bearing to be lubricated. The bearing can have special bores for this purpose via which the sealing fluid can be conducted to the relevant points of the bearing. The sealing fluid can be so-to-say freely selected. A sealing fluid can therefore be selected, for example a light petroleum product, with which an effective lubrication of the bearing is possible. In addition, the sealing fluid usually does not contain any contaminants so that the bearing does not have to be made robust with respect to contaminants. It is therefore not necessary for the bearing to be made up of particularly high-quality materials, which allows the use of an inexpensive bearing.

In an embodiment of the invention, the sealing arrangement also has, in addition to a supply line for the sealing fluid, a lead-off line via which sealing fluid can be led off from the sealing space. A circuit can thus be set up for the sealing fluid. In particular a sealing fluid pump is arranged in the circuit which conducts the sealing fluid to and from the sealing space. The circuit can contain a filter for filtering the sealing fluid and/or a cooler for cooling the sealing fluid. A sealing fluid reservoir can also be connected to the circuit and the sealing fluid pump can convey sealing fluid from it as required and introduce it into the circuit. An effective cooling of the bearing and also of the side ring seals can thus be ensured so that a secure operation of the sealing arrangement is made possible.

In an embodiment of the invention, the seal holder is designed in multiple parts. The seal holder can be composed of two, three or more parts which are connected to one another. Seals, in particular in the form of O rings, can be arranged between the individual parts. The multipart design of the sealing container allows a simple and thus inexpensive assembly of the sealing arrangement.

In an embodiment of the invention, guide elements are arranged in the sealing space for influencing a flow of the sealing fluid. The sealing fluid can thus be conducted directly to points at which it is needed particularly urgently. A particularly effective use of the sealing fluid is thus made possible.

The guide element in particular has a first guide element part and a second guide element part, with the first guide element part being stationary and the second guide element part rotating with the shaft. The two guide element parts are then arranged so that the sealing fluid flows between the guide element parts. The guide element can in particular be designed so that a pump effect arises on a rotation of the second guide element part so that the sealing fluid is pumped through by the guide element. An effective distribution of the sealing fluid in the sealing space can thus be made possible and a particularly effective influencing of the flow of the sealing fluid is possible.

The sealing arrangement in accordance with the invention can in particular advantageously be used with a pump. It is in particular arranged at a drive shaft of the pump via which the pump is driven, for example, by an electric motor.

Further advantages, features and details of the invention result with reference to the following description of embodiments and with reference to drawings in which elements which are the same or have the same function are provided with identical reference numerals.

Figure 2:
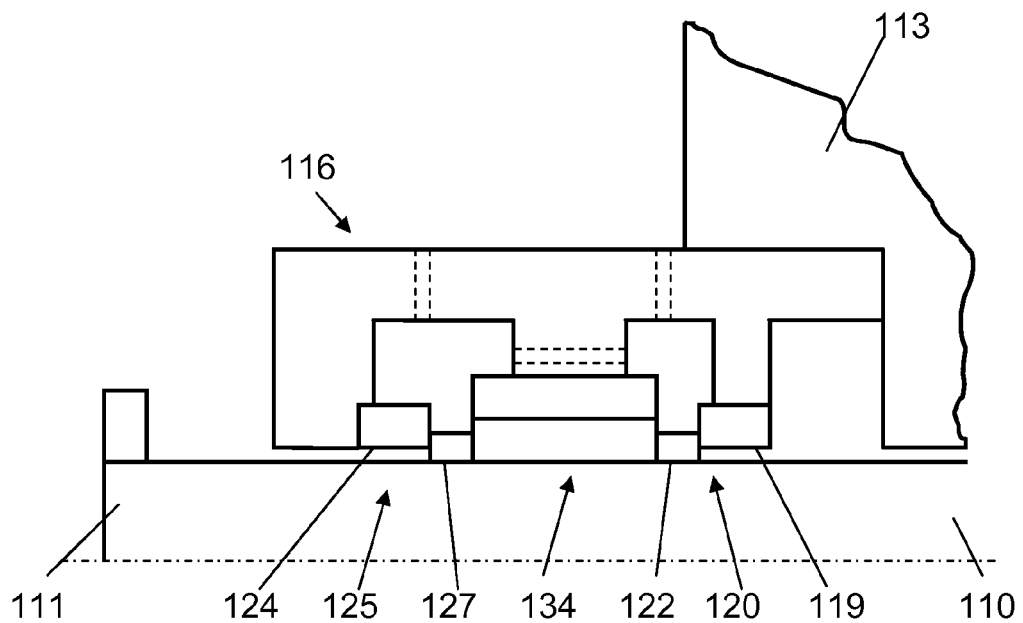
Figure 3:
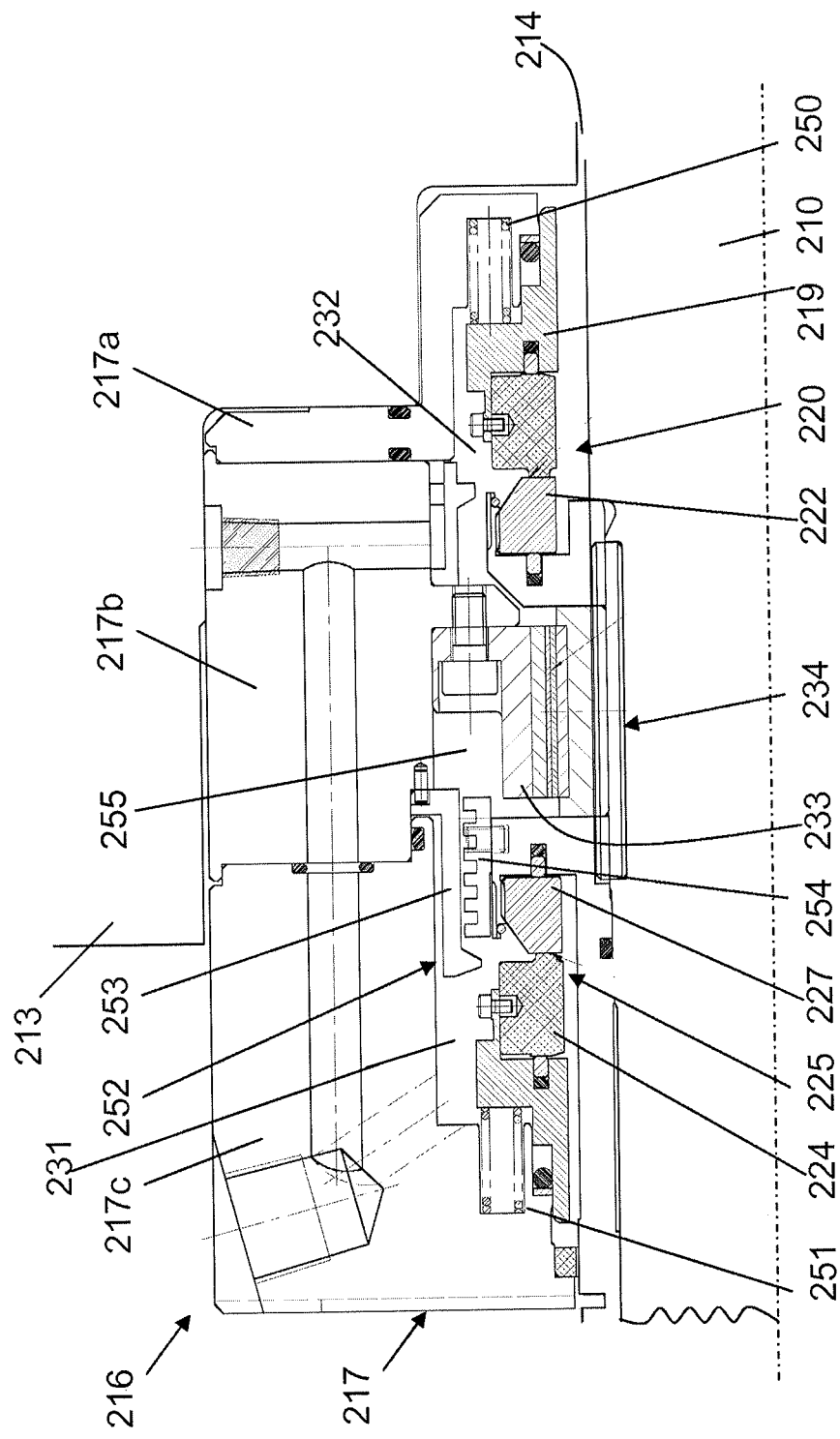

There are shown:

FIG. 1 a sealing arrangement for a rotating shaft with an integrated bearing;

FIG. 2 a sealing arrangement for a rotating shaft with an integrated bearing in a second embodiment; and FIG. 3 a sealing arrangement for a rotating shaft with an integrated bearing in accordance with FIG. 2 in a more detailed representation.

In accordance with FIG. 1, a shaft 10, which is designed as a drive shaft of a pump, has a connector coupling 12 for an electric motor, not shown, at a shaft end 11 and the shaft 10 and thus the pump can be driven by it. The pump is represented by a detail of a pump housing 13 from which the shaft 10 projects through a circular shaft passage 14. The pump housing 13 has a circular cut-out 15 around the shaft passage 14. The pump serves for the conveying of a working fluid, for example water or oil, which is present at a working pressure in the pump housing 13. To prevent the working fluid from exiting the pump housing 13 via the shaft passage 14, a sealing arrangement 16 is arranged around the shaft 10. A part of the seal arrangement 16 is received by the cut-out 15 of the pump housing 13.

The sealing arrangement 16 has a seal holder 17 which is arranged about the shaft 10 and projects into the cut-out 15 of the pump housing 13. It has a cut-out 28 through which the shaft 10 projects. The seal container 17 is screwed to the pump housing 13 via screws, not shown, and is thus stationary. It has a predominantly cylindrical base shape.

The sealing holder 17 has a first disk-shaped holder 18 which is oriented in the direction of the shaft 10 and which is arranged within the cut-out 15 of the pump housing 13. A first stationary sealing part 19 of a first slide ring seal 20 is fastened and thus supported at the first holder 18. The first stationary sealing part 19 has a first sealing surface 21 to a first co-rotating rotary sealing part 22 of the first slide ring seal 20. The first co-rotating rotary sealing part 22 is rotationally fixedly connected to the shaft 10.

The seal holder 17 moreover has a second disk-shaped holder 23 which is oriented in the direction of the shaft 10, which is arranged outside the cut-out 15 of the pump housing 13 and forms a closure of the seal holder 17 in the direction of the shaft end 11. A second stationary sealing part 24 of a second slide ring seal 25 is fastened and thus supported at the second holder 23. The second stationary sealing part 24 has a second sealing surface 26 to a second co-rotating rotary sealing part 27 of the second slide ring seal 25. The second co-rotating rotary sealing part 27 is rotationally fixedly connected to the shaft 10.

The two slide ring seals 20, 25 thus seal the pump housing 13 against an exit of the working fluid contained in the pump housing 13 via the shaft passage 14. They are arranged so that the shaft 10 can project through both slide ring seals 20, 25 and through the cut-out 28 of the holding part 17.

A sealing space 29 is formed between the first slide ring seal 20 and the second slide ring seal 25 and is divided by a third disk-shaped holder 30 into an outer sealing space 31 and an inner sealing space 32. An outer ring 33 of a slide bearing 34 is fastened to the third holder 30. An associated inner ring 35 of the slide bearing 34 is rotationally fixedly connected to the shaft 10 so that the shaft 10 is supported by means of the slide bearing 34 with respect to the seal holder 17.

The first slide ring seal 20 is arranged so that the first stationary sealing part 19 is arranged next to the slide bearing 34. The first rotary sealing part 22 is thus arranged toward the pump housing 13. The second slide ring seal 25 is arranged so that the second sealing part 27 is arranged next to the slide bearing 34. The second sealing part 24 is thus arranged toward the shaft end 11. The slide ring seals 20, 25 are thus arranged in a so-called tandem arrangement.

The seal holder 17 has a supply line 36 which leads from the outside to the outer sealing space 31. Sealing fluid is supplied via the supply line 36 to the outer sealing space 31 and thus to the sealing space 29. The sealing fluid is made as a light petroleum product and is known as a so-called "quench fluid". The pressure of the sealing fluid is equal to or smaller than the pressure of the working fluid to be blocked in the pump housing 13. The sealing fluid moves via a passage line 37 in the third holder 30 from the outer sealing space 31 to the inner sealing space 32. The sealing fluid is led off outwardly from the inner sealing space 32 and thus from the sealing space 29 via a lead-off line 38 in the seal holder 17.

A sealing fluid pump 39 which conveys sealing fluid to the supply line 36 is provided outside the sealing arrangement 16. The sealing fluid pump 29 sucks in sealing fluid via the lead-off line 38 from the inner sealing space 32. The sealing fluid pump 39 can additionally also suck in sealing fluid from a sealing fluid reservoir 40. The sealing fluid is cooled and purified in a cooling and purifying device 41 before the entry into the sealing fluid pump 39.

In the event that a leak should occur at the first sealing surface 21 of the first slide ring seal 20, the working fluid exiting the pump housing 13 mixes with the sealing fluid and is led off together with it via the lead-off line 38.

In addition, the sealing fluid also serves to lubricate and cool the sliding surfaces 21, 26 of the slide ring seals 20, 25.

A further important function of the sealing fluid is the lubrication and cooling of the slide bearing 34 which is flowed around by sealing fluid. Additional bores can be provided in the slide bearing 34 and/or in the third holder 30 via which sealing fluid can be conducted directly to particularly strained points of the slide bearing 34.

Two slide ring seals can also be arranged in a so-called back-to-back arrangement in addition to the tandem arrangement shown in FIG. 1. Such an arrangement is implemented in a second embodiment of a sealing arrangement for a rotating shaft which is shown in FIG. 2. The sealing arrangement in accordance with FIG. 2 is of a very similar structure to the sealing arrangement 16 in accordance with FIG. 1 so that only the differences of the two sealing arrangements will be looked at.

The sealing arrangement 116 in accordance with FIG. 2 likewise has a first slide ring seal 120 and a second slide ring seal 125. However, unlike the sealing arrangement 16 of FIG. 1, the first slide ring seal 120 is arranged so that a first rotary sealing part 122 is arranged beside a slide bearing 134. A first stationary sealing part 119 is thus arranged toward a pump housing 113. The second slide ring seal 125, like the first slide ring seal 25 in FIG. 1, is arranged so that a second rotary sealing part 127 is arranged next to the slide bearing 134. A second stationary sealing part 124 is thus arranged toward a shaft end 111 of a shaft 110. The slide ring seals 120, 125 are thus arranged in the above-named back-to-back arrangement.

A supplied sealing fluid is likewise designed as a light petroleum product and is in this case known as a so-called "barrier fluid". The pressure of the sealing fluid is greater than the pressure of the working fluid to be blocked in the pump housing 113.

A sealing arrangement 216 for a rotating shaft 210 with an integrated bearing 234 is shown in a detailed representation in FIG. 3. The structure of the sealing arrangement 216 in principle corresponds to the structure of the sealing arrangement 116 of FIG. 2. In the description of the sealing arrangement 216 predominantly smaller differences or additional details with respect to the sealing arrangement 116 of FIG. 2 will therefore be looked at.

A sealing holder 217 of the sealing arrangement 216 is of a three-part design. A first sealing holder part 217a serves for holding a first slide ring seal 220 whose first stationary sealing part 219 is pressed by a first spring 250 toward a first rotary sealing part 222. The first seal holder part 217a is in this respect arranged next to a shaft passage 214 of a first pump housing 213.

A first seal holder part 217a is adjoined by a second seal holder part 217b to which an outer ring 233 of the slide bearing 234 is fastened. The outer ring 233 is in this respect made up of three layers.

The second seal holder part 217b is adjoined by a third seal holder part 217c for holding a second slide ring seal 225 whose second stationary sealing part 224 is pressed by a second spring 251 toward a second rotary sealing part 227.

The seal holder parts 217a, 217b and 217c are sealed with respect to one another by seals in the form of O rings not further designated.

A guide element 252 for influencing a flow of the sealing fluid is arranged in an outer sealing space 231. The guide element 252 is made in two parts. A first, stationary guide element part 253 is fixedly connected to the second seal holder part 217b. A second, rotating guide element part 254 is fixedly connected to the second rotary sealing part 227 of the second slide ring seal 225. The outer contour of the second rotating guide element part 254 is in this respect designed so that sealing fluid is conveyed by its rotation from the outer sealing space 231 into a middle sealing space 255 which is arranged between the outer sealing space 231 and an inner sealing space 232.

The middle sealing space 255 and the inner sealing space 232 are connected by one or more passage lines. The passage lines are not located in the plane shown in FIG. 3 so that they cannot be seen in FIG. 3.

The invention claimed is:

1. A sealing arrangement for a rotating shaft, comprising:
   a stationary seal holder defining a cut-out configured for the shaft to project through the cut-out;
   a first slide ring seal supported in the seal holder and comprising a first co-rotating rotary sealing part and a first stationary sealing part;
   a second slide ring seal supported in the seal holder and comprising a second co-rotating rotary sealing part and a second stationary sealing part;
   a sealing space disposed between the slide ring seals and the seal holder;
   a supply line configured for a sealing fluid to be supplied to the sealing space via the supply line;
   wherein the slide ring seals are configured such that the shaft can project through both of the slide ring seals and through the cut-out;
   a bearing disposed between the first slide ring seal and the second slide ring seal, the bearing being configured to support the shaft with respect to the seal holder; and
   at least one guide element disposed in the sealing space and configured to pump the sealing fluid through the sealing space.

2. The sealing arrangement of claim 1, wherein the second co-rotating rotary sealing part and the first stationary sealing part are disposed adjacent to the bearing.

3. The sealing arrangement of claim 1, wherein both the first co-rotating rotary sealing part and the second co-rotating rotary sealing part are disposed adjacent to the bearing.

4. The sealing arrangement of claim 1, wherein the bearing is a slide bearing.

5. The sealing arrangement of claim 1, wherein the sealing fluid lubricates the bearing.

6. The sealing arrangement of claim 1, further comprising a lead-off line configured for the sealing fluid to be led off from the sealing space via the lead-off line.

7. The sealing arrangement of claim 1, wherein the seal holder comprises multiple parts.

8. The sealing arrangement of claim 1, wherein the at least one guide element comprises a first guide element part and a second guide element part, wherein the first guide element part is stationary and the second guide element part co-rotates and the two guide element parts are arranged so configured such that the sealing fluid flows between the guide element parts to thereby pump the sealing fluid through the sealing space.

9. A pump comprising a sealing arrangement in accordance with claim 1, and further comprising the rotating shaft.

10. The pump of claim 9, wherein the rotating shaft is a drive shaft.

11. The sealing arrangement of claim 1, wherein the at least one guide element is configured to pump the sealing fluid through the sealing space in an axial direction of the shaft.

* * * * *